(No Model.)

D. A. WOODBURY.
CONNECTING ROD.

No. 315,689. Patented Apr. 14, 1885.

Attest:
W. J. Creelman
H. N. Pryor

Inventor:
D. A. Woodbury

UNITED STATES PATENT OFFICE.

DANIEL A. WOODBURY, OF ROCHESTER, NEW YORK.

CONNECTING-ROD.

SPECIFICATION forming part of Letters Patent No. 315,689, dated April 14, 1885.

Application filed September 25, 1884. (No model.)

*To all whom it may concern:*

Be it known that I, DANIEL A. WOODBURY, a citizen of the United States, residing at the city of Rochester, in the county of Monroe and State of New York, have invented a new and useful Improvement in Connecting-Rods, of which the following is a specification.

My invention relates to improvements in rods in which the boxes are housed within an adjustable strap, the object being to provide more simple, convenient, and effective means for securing the strap and making the adjustments. I attain these objects by the mechanism illustrated in the accompanying drawings, in which—

Figure 1:
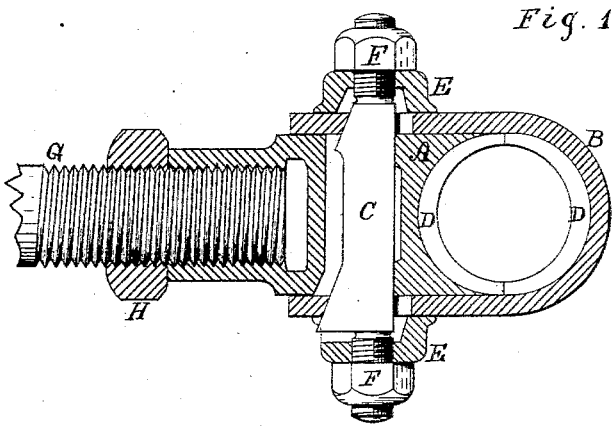
Figure 2:
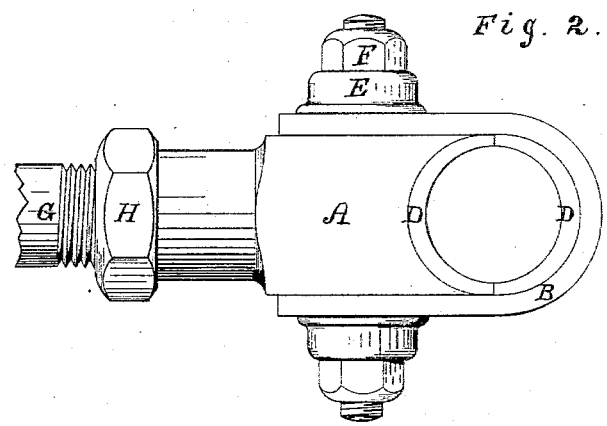
Figure 3:
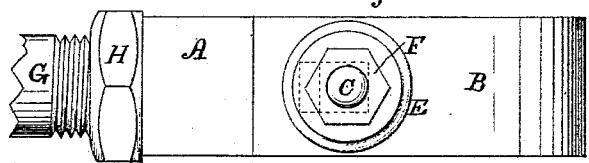

Figure 1 is a longitudinal vertical section; Fig. 2, a side elevation; Fig. 3, a plan view, and Figs. 4, 5, and 6 exhibit modifications.

The boxes D may be of any desirable form and the strap B of any suitable shape.

The key C is screw-threaded at both ends, and long enough to receive the cup-shaped washers E E and nuts F F, with sufficient allowance for adjustment.

It will be seen that the key performs double functions, that of securing the strap and binding it firmly to the butt or stub end A, preventing the slipping of one part upon the other, and consequent wear, and at the same time providing means for the adjustment of the fit of the boxes upon the pin.

Figure 4:
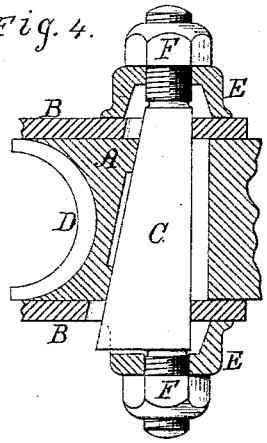

The key, as shown in Fig. 1, is in the form of a double wedge having two tapering portions, one acting upon one end of the strap and the other upon the other end. By this means greater compactness is obtained than when the taper is continuous throughout, as shown in Figs. 4 and 5.

The nuts F F may be doubled, so as to have one act upon the other as a jam-nut, or secured from accidental turning in any convenient manner.

Figure 5:
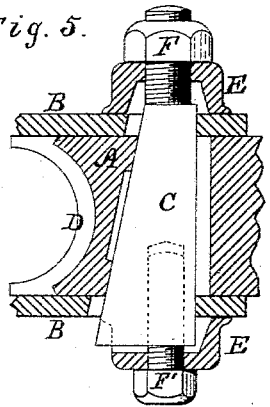

In Fig. 5 a tap bolt is substituted for the nut at one end of the key. Such bolts might be used at both ends, and in either form of key, if desired; but I prefer the construction as illustrated in Fig. 1.

Figure 6:
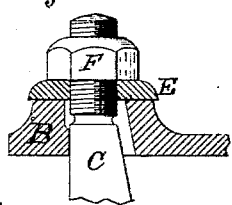

Instead of using the cup shaped washer, the strap might be made thicker at this point and chambered in a suitable manner to receive the end of the key, and a plain washer used, as shown in Fig. 6.

What I claim as my invention, and desire to secure by Letters Patent, is—

In a connecting-rod, the combination of the adjustable strap B and key C, provided with the cup-shaped washers E E and nuts F F, or their equivalent, substantially as shown and described.

DANIEL A. WOODBURY.

Witnesses:
W. J. CREELMAN,
H. H. PRYOR.